(12) United States Patent
Wheeler

(10) Patent No.: US 6,382,045 B1
(45) Date of Patent: May 7, 2002

(54) SINGLE LEVER SHIFT ASSEMBLY FOR AN ELECTRONICALLY CONTROLLED TRANSMISSION

(75) Inventor: Douglas J. Wheeler, Farmington Hills, MI (US)

(73) Assignee: Teleflex Incorporated, Plymouth Meeting, PA (US)

( * ) Notice: Subject to any disclaimer, the term of this patent is extended or adjusted under 35 U.S.C. 154(b) by 0 days.

(21) Appl. No.: 09/658,882

(22) Filed: Sep. 11, 2000

(51) Int. Cl.⁷ .............................................. F16H 63/38
(52) U.S. Cl. ................. 74/473.12; 74/473.27; 74/473.28; 74/473.31; 74/527
(58) Field of Search .................. 74/473.12, 473.27, 74/473.28, 473.31, 473.32, 527

(56) References Cited

U.S. PATENT DOCUMENTS

| | | | |
|---|---|---|---|
| 4,054,860 A | * 10/1977 | Henderson et al. | 338/32 H |
| 4,489,303 A | 12/1984 | Martin | 338/128 |
| 4,610,179 A | 9/1986 | Parker | 74/335 |
| 4,660,430 A | 4/1987 | Bortfeld et al. | 74/335 |
| 5,406,860 A | 4/1995 | Easton et al. | 74/335 |
| 5,775,165 A | 7/1998 | Lu | 74/473.28 |

FOREIGN PATENT DOCUMENTS

JP    8-14386   * 1/1996

* cited by examiner

*Primary Examiner*—Allan D. Herrmann
(74) *Attorney, Agent, or Firm*—Howard & Howard

(57) ABSTRACT

An assembly for shifting gear positions (10 and 110) in an electronically controlled transmission including a single lever control for moving between various gear positions. The assembly includes a shift lever (118) mounted to either a column support (14) or a base (112). The shift lever (118) either moves a detent finger (38) between a plurality of gear positions or moves a plurality of detent valleys (26) of a detent housing (20) into contact with a detent finger mechanism (22). The distal end (36) of the detent finger (38) includes a magnet (32) for generating a magnetic field. The detent valleys (26 and 126) represent each gear position and a Hall effect sensor (30) is disposed in the predetermined depth of each detent valley (26 and 126). The sensor (30) is activated by the magnetic field generated by the magnet (32) attached to the distal end (36) of the detent finger (38). In response, the sensor (30) generates an output voltage to a control module. The control module verifies the accuracy of the output voltage and signals the electronically controlled transmission to change gear positions. The assembly provides the feel of locking the shift lever (118) into a gear position through use of the detent valleys (26 and 126) while using a minimal amount of components.

13 Claims, 6 Drawing Sheets

SINGLE LEVER SHIFT ASSEMBLY FOR AN ELECTRONICALLY CONTROLLED TRANSMISSION

BACKGROUND OF THE INVENTION

1. Field of the Invention

An assembly for shifting gear positions in an electronically controlled transmission including a single lever control for moving between various gear positions.

2. Description of the Prior Art

Such assemblies typically include a shift lever pivotally mounted to a support for movement between a plurality of gear positions. The gear positions are established by a plurality of detent valleys. Each of the detent valleys corresponds to one of the gear positions such as park, reverse, neutral or drive. The use of detent valleys provides the operator with the feel of locking the shift lever into a gear position. The shift lever is held into the detent valley by a locking mechanism. The typical assemblies utilize a push button located at the top of the shift lever to release the locking mechanism and allow the shift lever to move to another gear position.

The assemblies also include a plurality of sensors that are used to detect the selected gear position of the shift lever. A common type of sensor used for this type of assembly is a Hall effect sensor. The Hall effect sensors generate an output voltage as the result of close proximity with a magnetic field. A plurality of magnets is used to generate the magnetic field necessary to activate the Hall effect sensors.

Examples of such assemblies are shown in U.S. Pat. No. 4,489,303 to Martin; U.S. Pat. No. 4,610,179 to Parker; U.S. Pat. No. 4,660,430 to Bortfeld; U.S. Pat. No. 5,406,860 to Easton; U.S. Pat. No. 5,775,165 to Lu. These assemblies include the use of detent valleys and Hall effect sensors to control the selection of gear positions within an electronically controlled transmission. These same assemblies use magnets to activate the sensors. Often there are several magnets used to activate several different Hall effect sensors at the same time. The activation of a specific combination of the Hall effect sensors generates the shifting of gear positions in the electronically controlled transmission.

These assemblies require a plurality of magnets and Hall effects sensors. The increased number of magnets and sensors increases the weight, size and cost of the assemblies. It would be desirable to have a shift lever assembly to control an electronically controlled transmission that would provide an operator with the feel of locking into the selected gear position while using fewer components.

SUMMARY OF THE INVENTION AND ADVANTAGES

The present invention provides single lever shift assembly for changing gear positions of an electronically controlled transmission comprising a column support or a base with two gates to support a shift lever. The shift lever is used to move between a plurality of gear positions. For a column shift assembly the shift lever is mounted to the column support at an end attachment of a terminal shaft. The assembly contains a plurality of detent valleys with each of the detent valleys corresponding to one of the gear positions. A detent finger mechanism is biased into the detent valleys. A plurality of sensors, for detecting the selected gear positions of the shift lever, is disposed in the detent valleys. A magnet supported by the detent finger mechanism activates the sensors to alert the electronically controlled transmission of the selected gear position.

An advantage of the present invention is that the shift lever moves between the plurality of gear positions without the use of a push button locking mechanism. The detent valleys provide a peak on each side that provides a lock for the shift lever. The peaks prevent the shift lever from inadvertently slipping into another gear position. Therefore, the use of detent valleys eliminate the need for a push button locking mechanism, thus reducing the number of components and the cost of the shift lever assembly.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
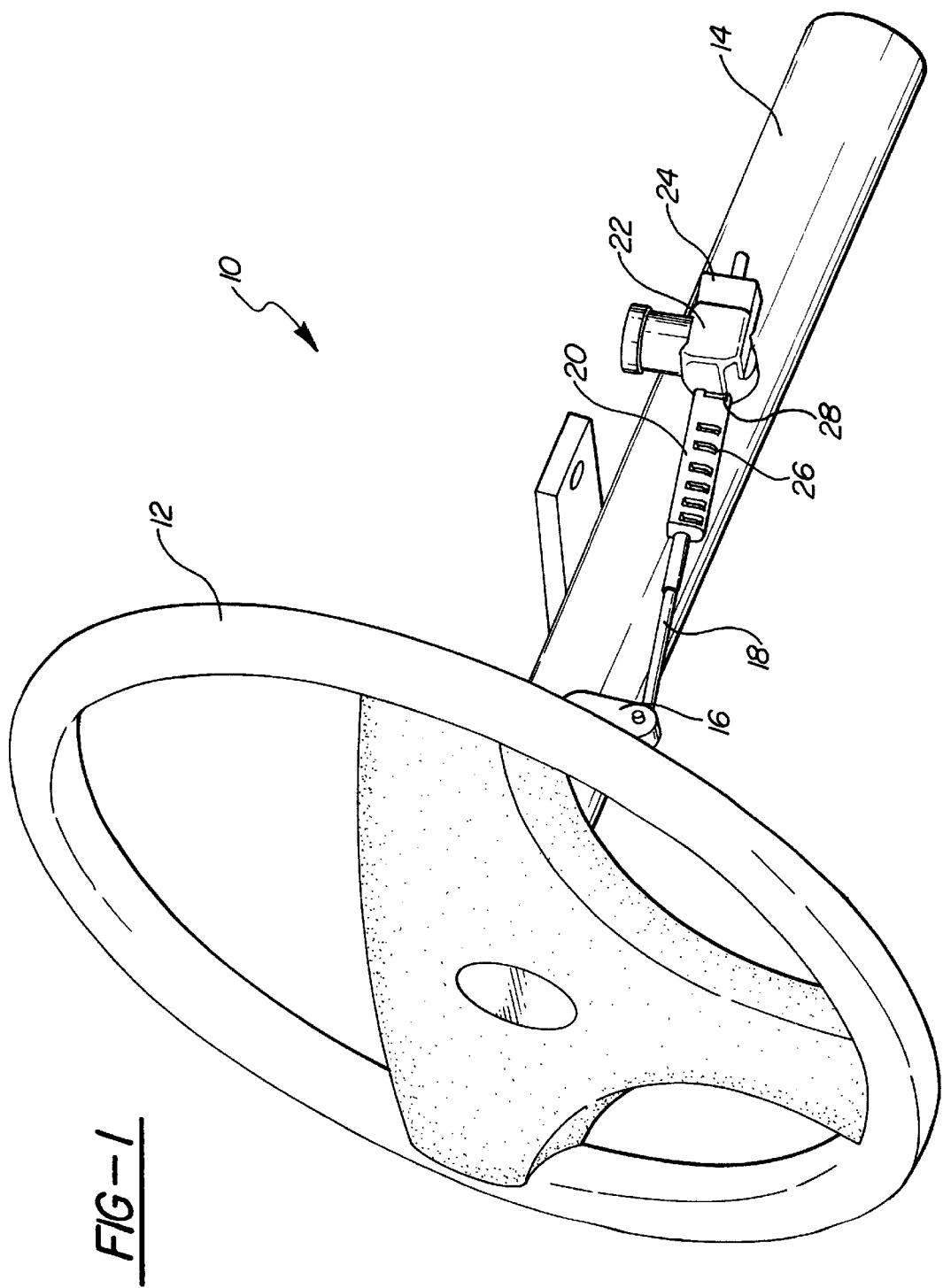
FIG. 1 is a perspective view of a column mounted single lever shift assembly of the present invention.
Figure 2:
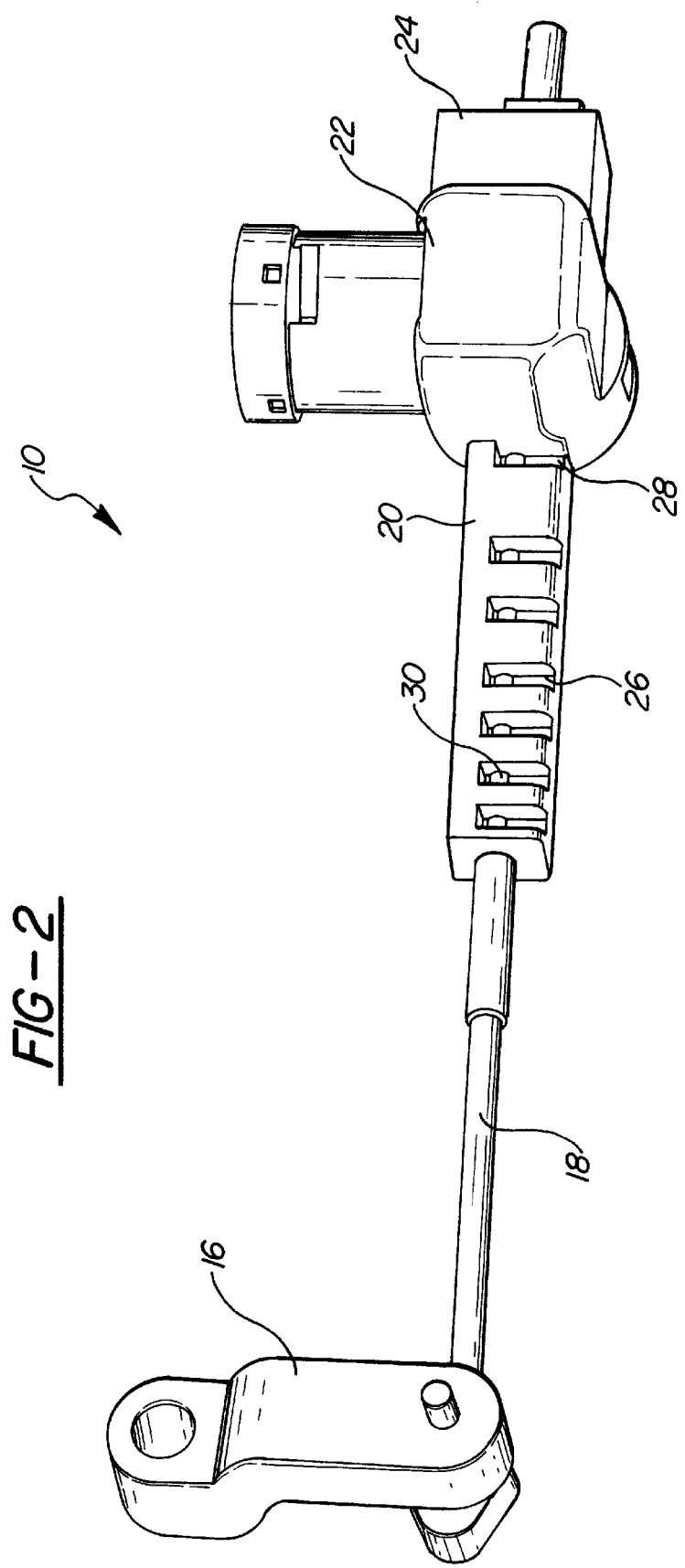
FIG. 2 is a perspective view of the detent plate in a column mounted single lever shift assembly of the present invention.
Figure 3:
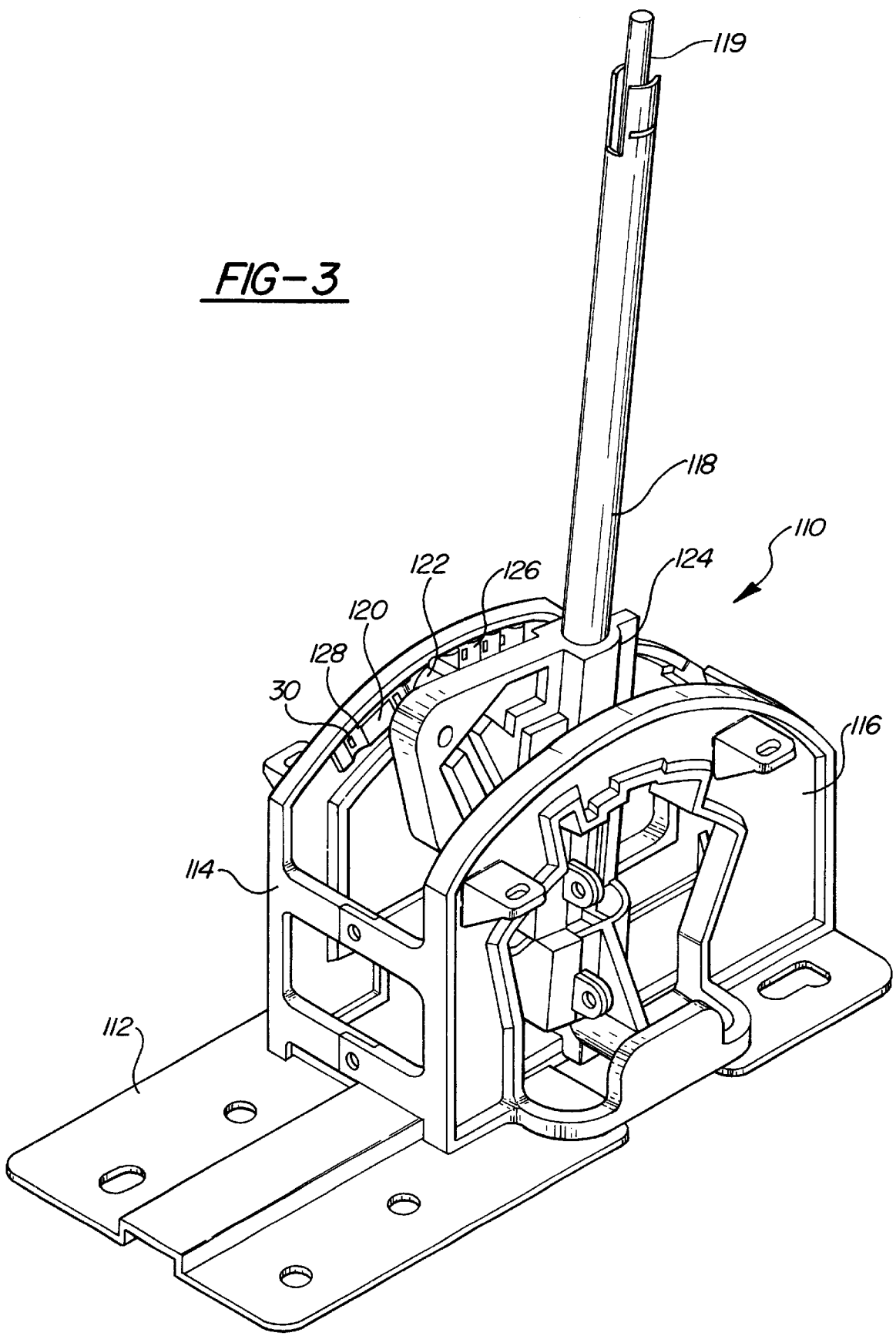
FIG. 3 is a perspective view of a console mounted single lever shift assembly of the present invention.
Figure 4:
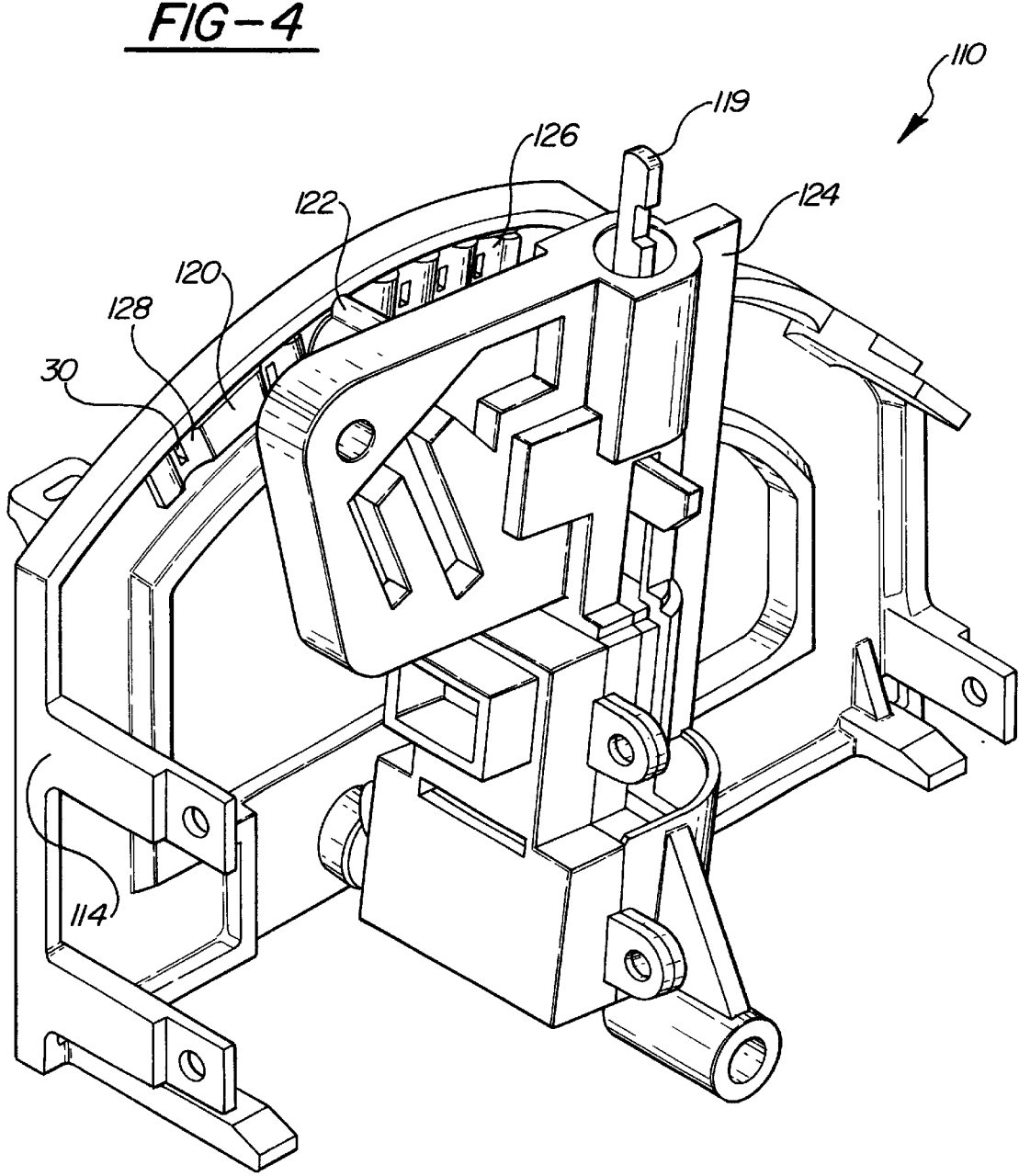
FIG. 4 is a perspective view of a console mounted single lever shift assembly of the present invention.
Figure 5:
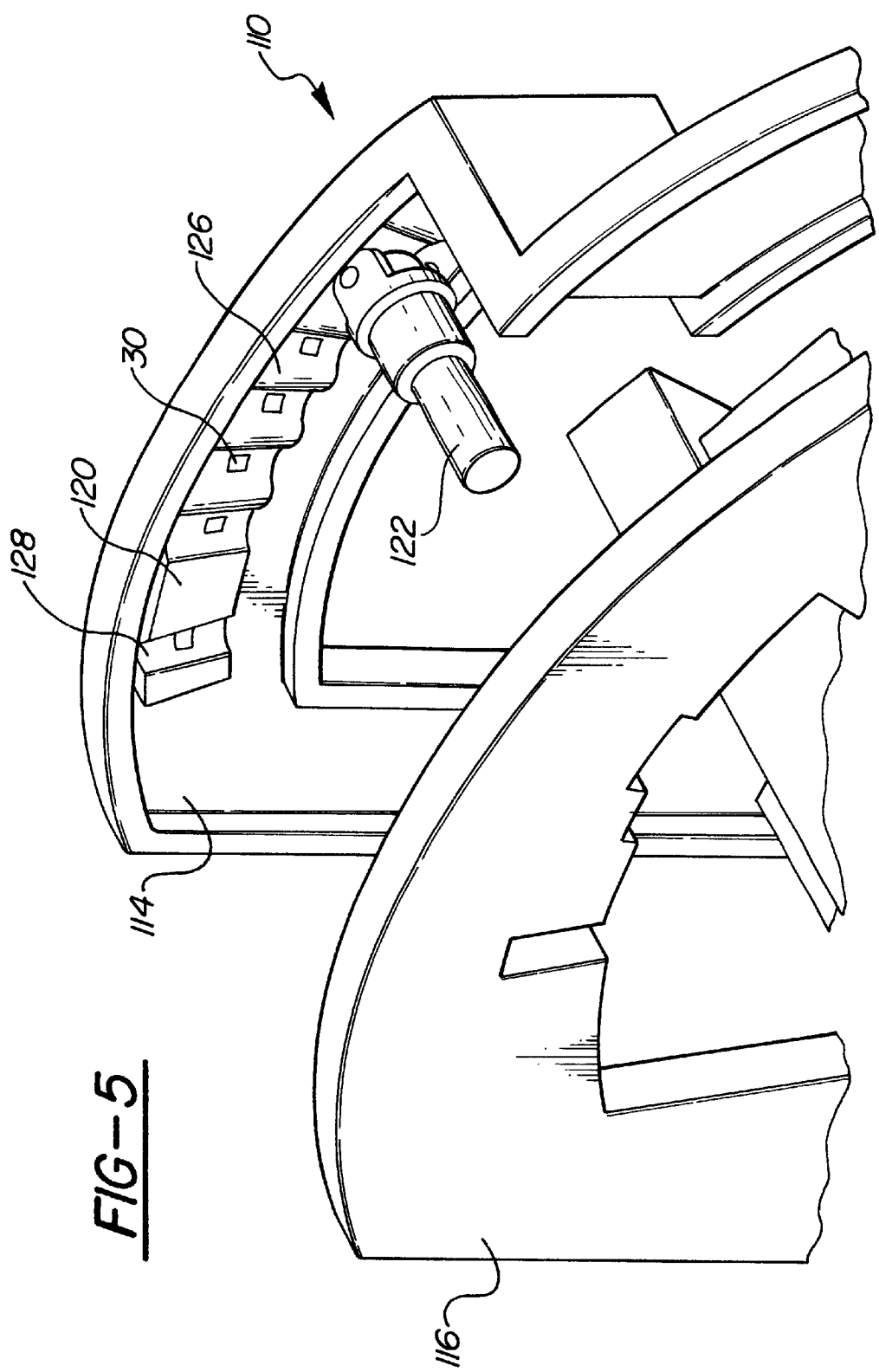
FIG. 5 is a perspective view of the detent plate in a console mounted single lever shift assembly of the present invention.
Figure 6:
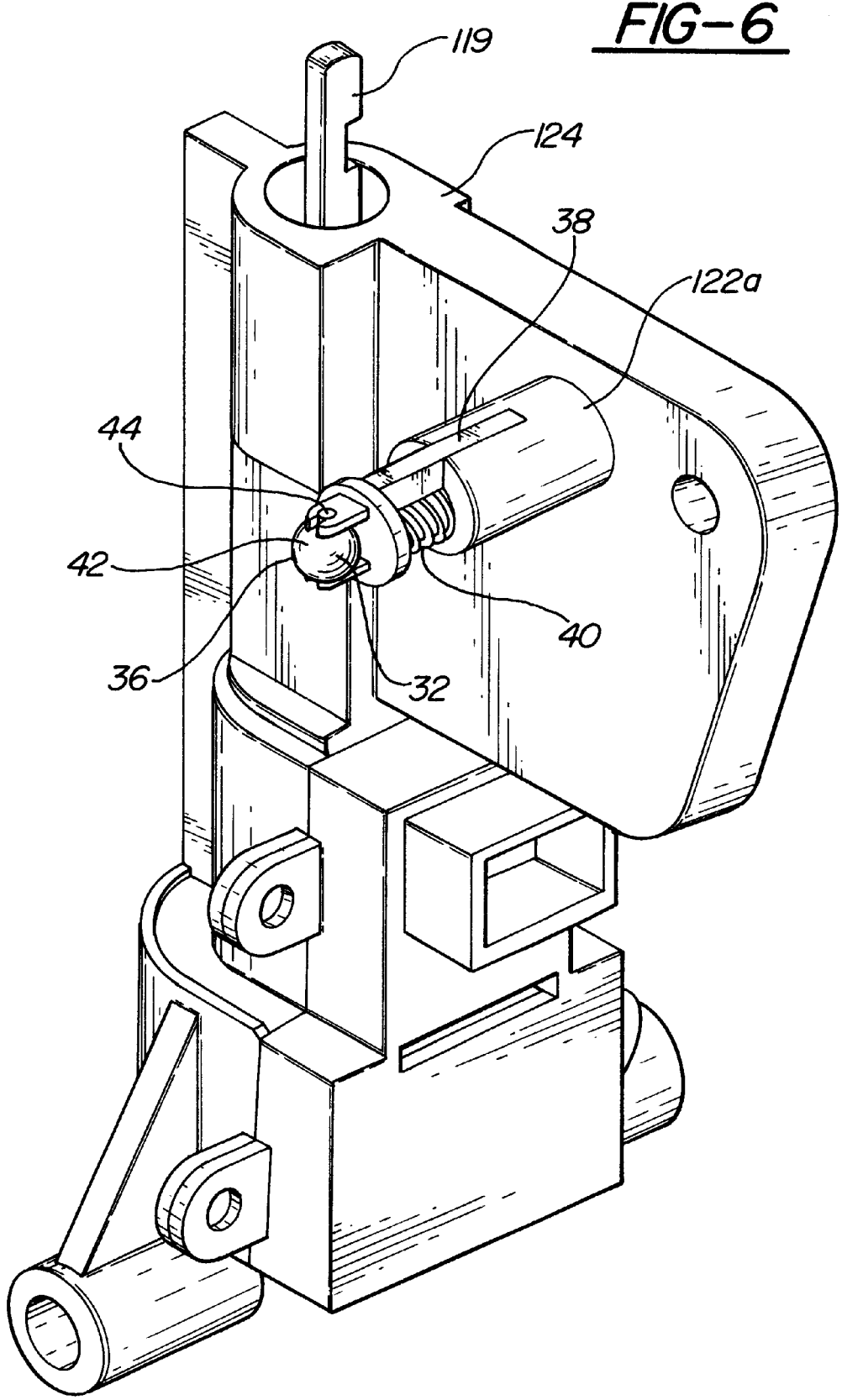
FIG. 6 is a side view of the detent finger in a single lever shift assembly of the present invention.

Referring to the Figures, wherein like numerals indicate like or corresponding parts throughout the several views, an assembly for shifting gear positions in an electronically controlled transmission is generally shown in two alternative embodiments 10 and 110.

The assembly 10 includes a steering wheel 12 attached to a vehicle by a column support 14. A shift lever (not shown) is mounted to an end attachment or lever support member 16. An operator adjusts the shift lever (not shown) to change between a plurality of gear selections such as park, reverse, neutral and drive. The end attachment 16 is located at the distal end of a terminal shaft 18. A detent housing 20 is connected to the terminal shaft 18. Surrounding the terminal shaft 18 is a detent finger mechanism 22 and an electromagnetic brake transfer shift interlock (BTSI) adjuster 24. The detent pin mechanism 22 and the BTSI adjuster 24 are fixed in their respective locations. When the operator moves the shift lever (not shown) the terminal shaft 18 and detent housing 20 move while the detent finger mechanism 22 and BTSI adjuster 24 remain in their fixed position around the terminal shaft 18. The detent housing 20 consists of a plurality of detent valleys 26 corresponding to different gear positions. Each of the detent valleys 26 has a first predetermined depth. A second predetermined depth corresponding to the detent valley of the park gear position 28 has a greater depth than the first predetermined depth of the other gear positions. By having a deeper detent valley, the operator must exert a greater effort to move the shift lever (not shown) from the park gear position 28 to another gear position. The feature of a greater predetermined depth is also combined with the BTSI adjuster 24 to provide a brake transfer shift interlock (BTSI). The BTSI adjuster 24 requires actuation of a foot brake pedal (not shown) before the detent housing 20, terminal shaft 18 and shift lever (not shown) are predetermined to move out of the park gear position 28. Greater detail of the detent housing 20 and the detent finger mechanism 22 will be described below in conjunction with the alternative embodiment of the assembly 110.

The assembly 110 includes a base 112 that is attached to the interior of the vehicle (not shown). Two gates 114 and 116 are attached to the base 112 and enclose a detent housing 120, detent finger mechanism 122 and BTSI adjuster (not shown). A shift lever 118 is attached to a lever housing or lever support member 124 that includes the detent finger mechanism 122 and BTSI adjuster (not shown). The finger mechanism 122a of Figure includes all of the same components as the finger mechanisms of the previous Figures, they only differ in external appearances. The operator adjusts the shift lever 118 by depressing linkage 119 to change between a plurality of selected gear positions such as park, reverse, neutral and drive. In this embodiment the detent housing 120 is stationary while the detent finger mechanism 122 and shift lever 118 move to the selected gear position. The detent housing 120 consists of a plurality of detent valleys 126 corresponding to different gear positions. Each of the detent valleys 126 has a first predetermined depth. A second predetermined depth corresponding to the detent valley of the park gear position 128 has a greater depth than the first predetermined depth of the other gear positions. By having a deeper detent valley, the operator must exert a greater effort to move the shift lever 118 from the park gear position 128 to another gear position. The feature of a greater predetermined depth is also combined with the BTSI adjuster (not shown) to provide a brake transfer shift interlock (BTSI). The BTSI adjuster (not shown) requires actuation of a foot brake pedal (not shown) before the shift lever 118 and the detent finger mechanism 122, 122a are permitted to move out of the park gear position 128.

The following descriptions of the subject invention are common to both embodiments of the assembly 10 and 110.

A sensor 30 is located at the predetermined depth of the detent valleys 26 and 126. When activated, the sensor 30 generates an output voltage. A control module interprets the output voltage. Upon verifying the accuracy of the output voltage the control module signals the electronically controlled transmission to shift into a different or newly selected gear position. Activating the sensor 30 with a magnetic field generates the output voltage. In the preferred embodiments the sensor 30 is a Hall effect sensor, however, it is to be understood that any type of suitable sensor could be used to detect the magnetic field. The Hall effect sensor generates the output voltage when it is in close proximity to the magnetic field. The sensor 30 could be placed in any position of the detent valley. However, in the preferred embodiments the sensor 30 is placed at the deepest point of the detent valleys 26 and 126. Placement of the sensor 30 at the deepest point of the detent valleys 26 and 126 helps ensure that the magnetic field does not activate more than one sensor 30. The operator and control module only intend to activate a single gear position at a time. If the sensor 30 were positioned, for example, near the peak of the detent valleys 26 and 126, there would be an increased risk of activating more than one sensor 30 with the magnetic field. This would produce an undesirable result. The control module would lock and the vehicle would become inoperable.

The magnetic field used to activate the sensor 30 is generated by a magnet 32 located at the distal end 36 of a detent finger 38. The detent finger 38 is a member of the detent finger mechanism 22 and 122 and 122a. The distal end 36 of the detent finger 38 extends into the predetermined depth of the detent valleys 26 and 126. A biasing device, such as a spring 40 (shown compressed), is used to urge the detent finger 38 into the predetermined depth of the depth valleys 26 and 126. The detent finger 38 includes at its distal end 36 a roller 42 supported by a support shaft 44. The roller 42 is used to help facilitate movement of the detent finger 38 between the detent valleys 26 and 126. The magnet 32 is either included in the roller 42 or the support shaft 44. The use of the detent finger 38, designed in this fashion, allows the assemblies 10 and 110 to provide the operator with the feel of locking into a gear position while using a minimal amount of components.

The assemblies 10 and 110 have a method of verifying the selected gear positions. A potentiometer is used to generate an output that is used to calculate the movement of the shift lever. The control module interprets the output from the potentiometer and based upon the amount of movement is able to determine the gear position selected by the operator. The control module then receives the output voltage of the sensor 30 and interprets the selected gear position. The gear positions determined from the output of the potentiometer and the output voltage from the sensor 30 are compared. If the two gear positions are the same, then the control module signals the electronic transmission to change the gear.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. An assembly for shifting gear positions (10 and 110) in an electronically controlled transmission comprising;

a support (14 or 112);

a lever support member (16 or 24) pivotally mounted to said support (14 or 112) for movement between a plurality of gear positions by a shift lever;

a plurality of detent valleys (26 and 126) with each of said detent valleys (26 and 126) corresponding to one of said gear positions;

a detent finger mechanism (22 and 122) biased into said detent valleys (26 and 126);

a plurality of sensors (30) for detecting selected said gear position of said lever support member (16 or 124);

a magnet (32);

said assembly characterized by said magnet (32) supported by said detent finger mechanism (22 and 122) for establishing a magnetic field and one of said plurality of said sensors (30) disposed in each of aid detent valleys (26 and 126) for sensing said magnetic field.

2. An assembly as set forth in claim 1 wherein each of said detent valleys (26 and 126) has a predetermined depth.

3. An assembly as set forth in claim 2 wherein at least one of said detent valleys (28 and 128) has a depth greater than the depth of the remaining detent valleys (26 and 126).

4. An assembly as set forth in claim 3 wherein each of said sensors (30) is disposed at said predetermined depth.

5. An assembly as set forth in claim 4 wherein a detent finger (38) is supported by said detent finger mechanism (22 and 122) and extends to a distal end (36).

6. An assembly as set forth in claim 5 wherein said magnet (32) is supported by said detent finger (38) at said distal end (36).

7. An assembly as set forth in claim 6 including a roller (42) rotatably supported at said distal end (36) of said detent finger (38) for facilitating movement of said detent finger (38) between said detent valleys (26 and 126).

8. An assembly as set forth in claim 7 wherein said roller (42) includes said magnet (32).

9. An assembly as set forth in claim 8 wherein said roller (42) includes a support shaft (44) for rotatably supporting said roller (42) on said detent finger (38).

10. An assembly as set forth in claim 9 wherein said magnet (32) is defined by said support shaft (44).

11. An assembly as set forth in claim 5 including a biasing device (40) for reacting between said detent finger (38) and said shift lever (118) to urge said detent finger (38) into said detent valleys (26 and 126).

12. An assembly as set forth in claim 1 wherein said support includes a steering column (14).

13. An assembly as set forth in claim 1 wherein said support includes a base (112) with two gates (114 and 116).

* * * * *